United States Patent Office 2,994,695
Patented Aug. 1, 1961

2,994,695
TETRAHYDROPYRIMIDINE DERIVATIVES AND THEIR PREPARATION

John A. Gallaghan and Robert Evans, Indian Head, Md., assignors to the United States of America as represented by the Secretary of the Navy
No Drawing. Filed Aug. 25, 1955, Ser. No. 530,645
7 Claims. (Cl. 260—256.4)
(Granted under Title 35, U.S. Code (1952), sec. 266)

The invention described herein may be manufactured and used by or for the Government of the United States of America for governmental purposes without the payment of any royalties thereon or therefor.

This invention relates to new and useful tetrahydropyrimidine derivatives and their preparation. More particularly, the invention relates to 2-imino-5-hydroxytetrahydropyrimidinium salt, 2-nitrimino-5-nitroxytetrahydropyrimidine, and simple derivatives thereof, and methods of preparing these compounds.

An object of the invention is to provide the new compound 2 - imino - 5-hydroxytetrahydropyrimidinium salt and simple derivatives thereof.

It is a further object of the invention to provide the new compound 2-nitrimino-5-nitroxytetrahydropyrimidine and simple derivatives thereof.

A still further object of the invention is to provide a method for the preparation of the foregoing compounds.

Still further objects and the attendant advantages of the invention will be obvious to those skilled in the art from the more detailed description set forth below, it being understood that the following detailed description is given by way of illustration and explanation only, and not by way of limitation.

The foregoing objects are accomplished by a method comprising the following steps:

(1) Reacting s-alkyl trio-pseudourea or o-alkyl pseudourea, or preferably salts thereof, with an excess of 1,3-diamino-2-hydroxypropane to produce the new compound 2-imino-5-hydroxytetrahydropyrimidinium salt.

(2) Nitrating the above prepared 2-imino-5-hydroxytetrahydropyrimidinium salt to produce the new compound 2-nitrimino-5-nitroxytetrahydropyrimidine.

The above described method may be illustrated for reasons of clarity and conciseness only by the following general reactions:

(A)

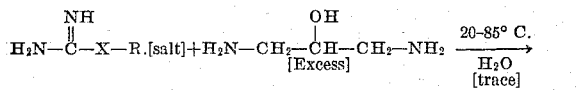

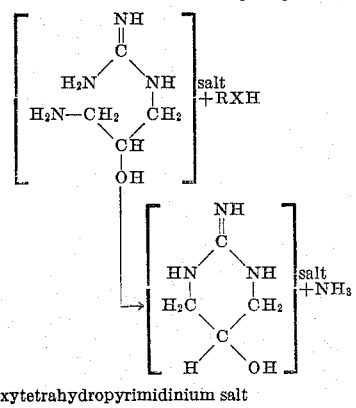

2-imino-5-hydroxytetrahydropyrimidinium salt (B)

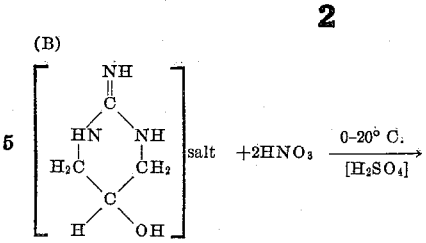

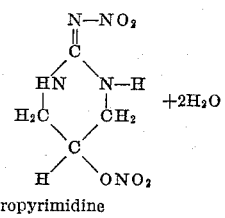

2-nitrimino-5-nitroxy-tetrahydropyrimidine wherein X is either oxygen or sulfur and R is a lower alkyl group, preferably of one to five carbon atoms.

Referring to Reaction A, any suitable salt of the particular pseudourea selected may be reacted with a substantial excess of 1,3-diamino-2-hydroxy propane. The reaction may be carried out with or without a solvent, such as for example, alcohol or water, but a trace of water aids in starting the reaction where water is not present. A reaction time of about 30 minutes to 2 hours at a temperature of about 20–85° is satisfactory, but in some instances yields may be improved by longer reaction times. The reaction product may be easily recovered by any suitable method, such as by cooling the reaction mixture and pouring over cracked ice, separating the crude product obtained thereby, and recrystallizing from an alcohol-water solution.

Referring to Reaction B, the nitration of 2-imino-5-hydroxytetrahydropyrimidinium salt to produce 2-nitrimino-5-nitroxytetrahydropyrimidine may be carried out by any suitable method, such as with a nitric-sulfuric acid mixture. Higher yields usually result if nitric acid is present in slight excess. Any suitable temperature and time of reaction may be used, a temperature of about 0–20° C. and a reaction time of about 30 minutes to 2 hours is usually satisfactory. The reaction product may be easily recovered by any suitable method, such as by cooling the reaction mixture and pouring over cracked ice, separating the crude product obtained thereby, and then leaching out impurities with water. A product of satisfactory purity for most purposes may be obtained thereby, however, a product of higher purity may be obtained by recrystallization from a water-alcohol solution.

The invention is more particularly illustrated by the following examples:

EXAMPLE I

Preparation of 2-imino-5-hydroxytetrahydopyrimidinium salt

An ethyl alcohol solution in the proportion of one molar part of O-methyl pseudourea ethyl sulphate and ½ molar part of 1,3-diamino-2-hydroxypropane was refluxed with stirring for a period of approximately eight hours. The alcohol was evaporated and the crude product obtained as a viscous oil. The picrate of the product, 2-imino-5-hydroxytetrahydropyrimidinium ethyl sulphate, was prepared and found to have the following analysis and melting point: M.P., 185–186° C. [with decomposition].

Analysis:

| | C | H | N |
|---|---|---|---|
| Calculated | 33.3 | 3.3 | 23.3 |
| Found | 33.6 | 3.4 | 23.4 |

EXAMPLE II

*Preparation of 2-nitrimino-5-nitroxytetrahydropyrimidine*

One part by weight of the crude 2-imino-5-hydroxytetrahydropyrimidinium ethyl sulphate, as above prepared, was reacted with stirring with a nitric-sulfuric acid mixture composed of two parts by weight concentrated nitric acid and four parts by weight concentrated sulfuric acid at a temperature of 0–20° C. for a period of approximately one to two hours. The reaction mixture was cooled, poured over cracked ice, and the crude product purified by recrystallization from hot water. The pure product, 2-nitrimino-5-nitroxy-tetrahydropyrimidine, recrystallizes from alcohol in white micaceous crystals, melts at 218° C. with decomposition, has an index of refraction of $N_D$ 25° C.=1.508, and a solubility of 0.062 g. 100 ml. $H_2O$ at 25° C. An analysis for C, H and N gave the following results:

| | C | H | N |
|---|---|---|---|
| Calculated | 23.41 | 3.44 | 34.14 |
| Found | 23.54 | 3.37 | 34.22 |

Other salts such as the sulphate or nitrate salt of 2-imino-5-hydroxytetrahydropyrimidine can be used in lieu of the ethyl sulphate salt if desired.

The above prepared 2-nitrimino-5-nitroxytetrahydropyrimidine is useful as an ingredient of so called "cool" propellant powders as a substitute for nitroguanidine therein. Thus the above compound may be substituted in like percentages for nitroguanidine in standard cordite N powder formulations well known in the art to produce desirable modifications in properties, such as (1) more rapid burning (2) more ready ignition, especially at low temperatures, and (3) reduction of large crystal complexes normally present in nitroguanidine propellants.

2-nitrimino-5-hydroxytetrahydropyrimidine containing powder formulations show excellent compatibility with nitrocellulose. A composition comprising 2 parts of the above compound, 2 parts nitrocellulose, and 3 parts dibutyl phthalate was prepared by usual mixing procedures for cordite N powders and extruded in strands. Tests ran on the strands thus prepared gave the following results:

Impact sensitivity _____ failed [600 mm.].
Ignition temperature _____ 172° C.
120° C. methyl violet heat test__ 74′–82′.
110° C. Taliani test [$N_2$] _____ 0.25 mm./min. at 100 mm. pressure.

Obviously many modifications and variations of the present invention are possible in the light of the above teachings. It is, therefore, to be understood that within the scope of the appended claims the invention may be practiced otherwise than as specifically described.

What is claimed as new and desired to be secured by Letters Patent of the United States is:

1. Compounds selected from the group consisting of 2-imino-5-hydroxytetrahydropyrimidinium nitrate, 2-imino-5-hydroxytetrahydropyrimidinium sulfate and 2-imino-5-hydroxytetrahydropyrimidinium ethyl sulfate.

2. The new compounds of 2-imino-5-hydroxytetrahydropyrimidinium nitrate.

3. The new compound 2-imino-5-hydroxytetrahydropyrimidinium sulfate.

4. The new compound 2-imino-5-hydroxytetrahydropyrimidinium ethyl sulfate.

5. The method of preparing a 2-imino-5-hydroxytetrahydropyrimidinium salt which comprises reacting a compound selected from the group which consists of compounds of the general formula

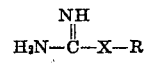

and the nitrates, sulfates and ethyl sulfates thereof wherein X is an element selected from the group consisting of oxygen and sulfur and R is a lower alkyl group having from one to five carbon atoms, with an excess of 1,3-diamino-2-hydroxy propane and recovering the 2-imino-5-hydroxytetrahydropyrimidinium salt from the reaction mixture.

6. The method of preparing 2-imino-5-hydroxytetrahydropyrimidinium ethyl sulfate which comprises reacting O-methyl pseudourea ethyl sulfate with an excess of 1,3-diamino-2-hydroxypropane and recovering the 2-imino-5-hydroxytetrahydropyrimidinium ethyl sulfate from the reaction mixture.

7. The method of preparing 2-imino-5-hydroxytetrahydropyrimidinium ethyl sulfate which comprises refluxing O-methyl pseudourea ethyl sulfate with an excess of 1,3-diamino-2-hydroxypropane at a temperature between 20–85° C. for a period of 30 minutes to 2 hours, and recovering the 2-imino-5-hydroxytetrahydropyrimidinium ethyl sulfate from the reaction mixture.

No references cited.